Jan. 21, 1964   M. J. FLIEGLER ETAL   3,119,088
WIPER ASSEMBLY FOR A MULTITURN POTENTIOMETER
Original Filed Oct. 25, 1961   2 Sheets-Sheet 2
Fig. 6.
Prior Art
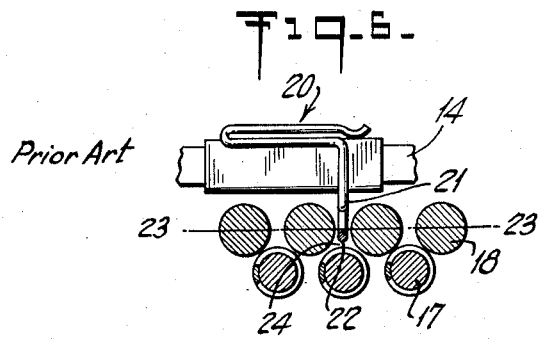
Fig. 7.
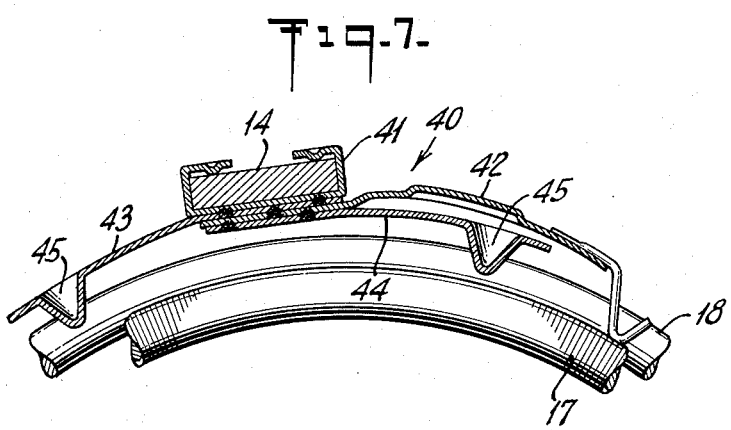
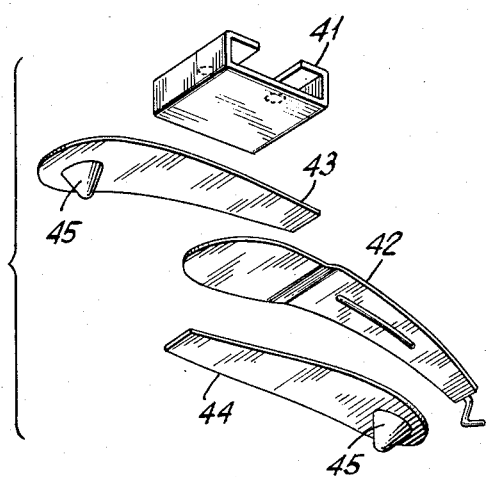
Fig. 8.
INVENTORS
MICHEL J. FLIEGLER
HAROLD C. PASINI
BY
ATTORNEY

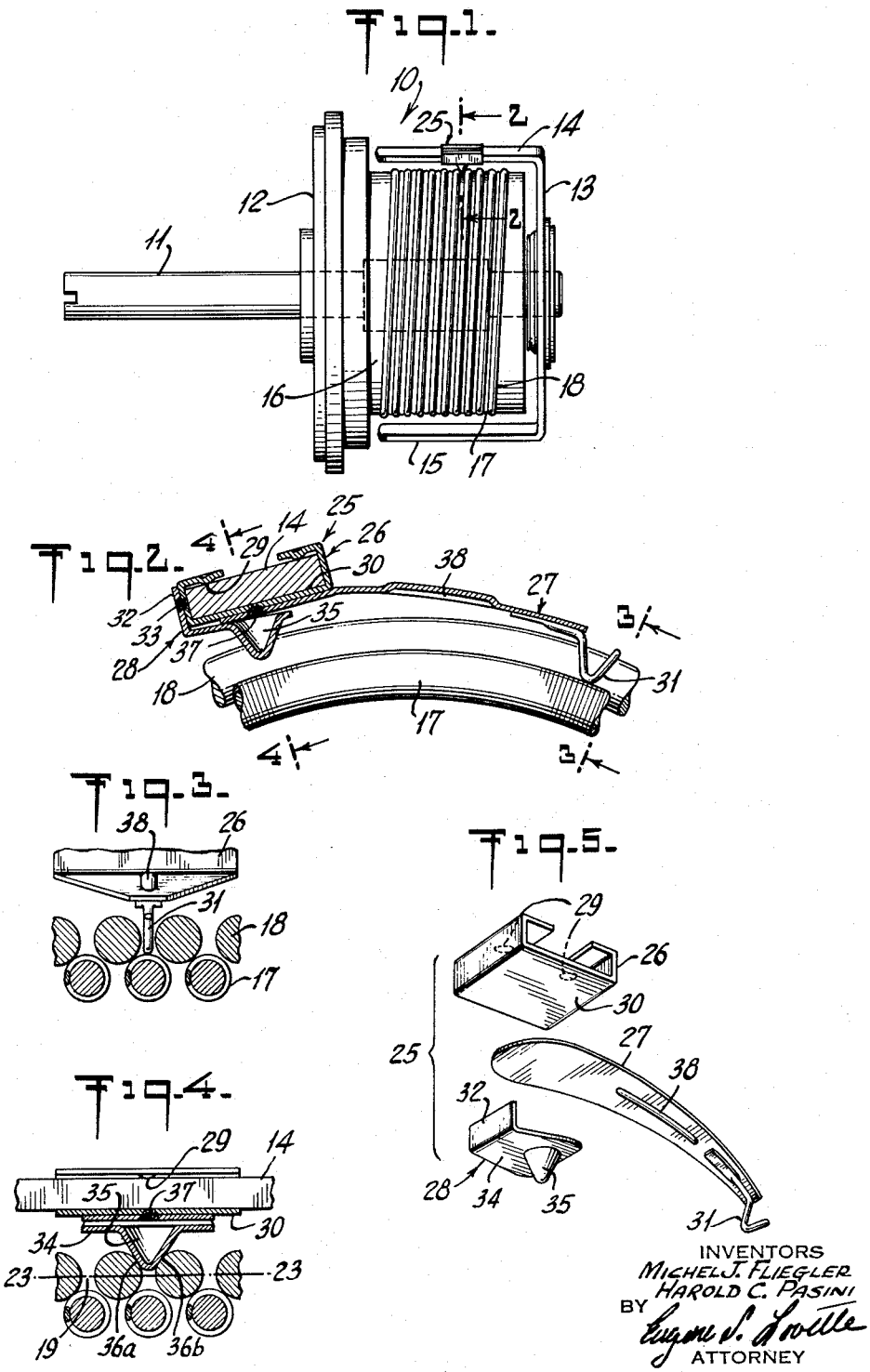

United States Patent Office 3,119,088
Patented Jan. 21, 1964

3,119,088
WIPER ASSEMBLY FOR A MULTITURN
POTENTIOMETER
Michel J. Fliegler, Commack, N.Y., and Harold C. Pasini, Westwood, N.J., assignors to Analogue Controls, Inc., Hicksville, N.Y., a corporation of New York
Continuation of application Ser. No. 147,589, Oct. 25, 1961. This application Nov. 14, 1962, Ser. No. 238,326
6 Claims. (Cl. 338—143)

This invention relates to electrical multiturn potentiometers and, in particular, to an improved wiper assembly for use in such potentiometers.

This invention is a continuation of our copending application Serial No. 147,589, filed October 25, 1961 and entitled Wiper Assembly for a Multiturn Potentiometer, and now abandoned.

It is the principal object of this invention to provide an improved wiper assembly for use in a multiturn potentiometer, which wiper assembly is specifically designed to maintain its guide contact means continuously captivated in a potentiometer helical track so as to assure that the operatively associated wiper contact element is continuously making proper electrical sliding connection with the potentiometer resistor element.

It is a further object of the invention to provide an improved wiper guide means for engagement with a helical guide track of a multiturn potentiometer, wherein the guide means at all times is continuously captivated in the track, and whereby such guide means is prevented from escaping from said track or accidently shorting the resistor element.

Further objects and advantages will become apparent from the following description, wherein:

FIG. 1 is a longitudinal elevation of a multiturn potentiometer incorporating the principles of the invention;

FIG. 2 is a fragmentary view in elevation and partly in section taken along line 2—2 of FIG. 1 for illustrating an improved wiper assembly in accordance with the principles of the invention;

FIG. 3 is a fragmentary section taken along line 3—3 of FIG. 2;

FIG. 4 is a fragmentary section taken along line 4—4 of FIG. 2;

FIG. 5 is an exploded view in perspective illustrating the components constituting the improved slider and guide wiper assembly;

FIG. 6 depicts prior art structure;

FIG. 7 is a fragmentary view in elevation illustrating another embodiment of an improved wiper assembly; and FIG. 8 is an exploded view in perspective illustrating the assembly of FIG. 7.

Reference is now made to FIGS. 1 through 5 for an illustration of a wiper assembly incorporating the principles of the invention. As noted hereinbefore, the invention concerns an improved wiper assembly for use in a multiturn potentiometer, for example, a potentiometer of the type illustrated in U.S. Patent No. 2,871,326 for "Precision Potentiometers" and issued to J. W. Weidenman et al.

The multiturn potentiometer 10 has an input shaft 11. Shaft 11 is mounted to turn in either direction about its axis within a concentric hub assembly structure 12. Hub assembly structure 12 is stationary with respect to shaft 11, and this structure includes suitable ball bearing means, not shown herein, for permitting rotation of shaft 11 within the hub structure 12. Reference may be made to the cited patent for a detailed illustration of the potentiometer 10. The inner end of shaft 11 carries a U-shaped wiper assembly carrier 13 made of conductive material. Carrier 13 is keyed to the inner end of shaft 11 to turn therewith. Carrier 13 has a pair of parallel spaced conducting arms 14, 15. Arms 14, 15 are rectangular in cross-section. Arms 14 and 15 extend axially from the rear of the potentiometer towards the front thereof in parallel relationship with respect to the shaft axis. As understood in the art, carrier 13 including its arms 14, 15 are equipped to rotate in accordance with rotation of input shaft 11.

Hub assembly 12 includes a cylindrical core 16 of electrical insulator material extending axially between carrier arms 14, 15. A continuous winding of resistance wire 17 is mounted on core 16 in a form of a helix. A continuous winding of guide wire 18 is mounted in the form of a helix over resistance wire 17. Guide helix 18 is covered with an electrical insulator paint or other coating; hence, for the purpose herein, guide helix 18 is a non-conductor. In essence, the individual turns of guide helix 18 sit in the helical groove defined by the adjacent turns of resistance wire 17, whereby the grooves between the adjacent turns of guide helix 18 define a guide track 19 for effecting back and forth travel of a wiper assembly along one of the carrier arms. As seen from the figures, the outer periphery of guide helix 18 extends radially beyond the outer periphery of resistance wire 17, such that the helical track 19 is bounded at the bottom by resistance wire 17 and along its sides by adjacent turns of helix guide 18.

As known in the art, the opposite ends of resistance and guide wires 17, 18 are fastened to core 16. In addition, the ends of resistance wire 17 and carrier 13 are individually connected through suitably conductive means to respective potentiometer terminals. These specific details and other details of potentiometer 10 are not shown herein because they are well-known to the art and because reference may be made to the cited patent for further information.

Carrier 13 functions as a slideable tap connection to resistor wire 17. In the prior art, the slideable tap connection is made by a two-armed wiper assembly 20 slideably mounted on one arm 14 of the carrier. Wiper assembly 20 is provided with one depending arm designed to contact slideably the resistor wire, whereas the other arm, or guide 21, depends from the wiper assembly 20 to register slideably in helical track 19. Upon rotation of shaft 11, carrier arm 14 rotates about the shaft axis which results in guide 21 traveling along helical track 19, whereby wiper assembly 20 follows by sliding in either direction (depending upon the direction of shaft rotation) along carrier arm 14. The problem created by the prior art structure and solved by the instant invention can best be understood by reference to FIG. 6. This figure shows a section of carrier arm 14 and a wiper assembly 20 slideably mounted thereon. Assembly 20 has a depending guide 21 extending down between adjacent turns of helical wire 18. The figure does not show the wiper arm for slideably contacting resistance wire 17. Guide 21 is a long wire-like element provided with a looped lower end 22 to provide a smooth surface extending into helical track 19. A perspective view of same is illustrated in the cited patent. The lower end 22 of guide 21 is designed to terminate below the horizontal center line 23 of the helical wound guide wire. A small gap 24 is provided between the guide end 22 and resistance wire 17 to avoid accidental contact therebetween. Such contact would create spurious shorts. Great care and expense is observed in the design, fabrication and assembly of a potentiometer employing such prior art wiper assembly 20 to assure that guide 21 remains captivated at all times in helical track 19 without closing gap 24 to avoid spurious shorts of resistance wire 17. In spite of such care and the use of expensive jigs in the fabrication of wiper 20, potentiometer shorting is not entirely eliminated. The problem cannot be readily solved by shortening the vertical projection of guide 21 to increase the gap length between it and resistance wire 17. When guide 21 is shortened to terminate at or above the horizontal center line 23 of track 19, guide 21 will ride up along the side of helix wire 18 and jump its track. As understood in the art, escape of guide 21 from track 19 destroys the usefulness of the potentiometer.

Reference is now made to FIGS. 2 through 5 for the details of the improved wiper assembly 25 which is made up of a support member and slide 26, a wiper contact 27 and a guide 28. Slide 26 and wiper 27 are made of electrical conducting material. For fabrication convenience, guide 28 is also made of the same metal. Slide 26 is folded over and mounted on a carrier arm 14 to slide back and forth therealong. A pair of detents 29 facilitate movement of slide 26 along arm 14. The bottom wall 30 of slide 26 is contiguous to the underside of arm 14. The large end of contact 27 is spot welded at 37 to slide wall 30. A V-shaped nib 31 of conductive material is spot welded to the narrow end of contact 27. Contact 27 has a reinforcing rib 38. Contact 27 extends substantially lateral with respect to the lengthwise dimension of carrier arm 14 and is slightly curved, whereby nib 31 extends down between adjacent turns of guide wire 18 to make continuous slideable contact with resistance wire 17 upon assembly of the structure; this is illustrated in FIGS. 2 and 3.

Guide 28 has an upright side wall 32 spot welded at 33 to a side wall of slide 26. Guide element 28 also has a lateral wall 34 joined to its side wall 32. When guide 28 is attached to slide 26, wall 34 is spaced below the adjacent large end of contact 27 underneath arm 14. Lateral wall 34 includes a stamped out cone-shaped projection 35 equipped to fit into helical track 19 upon attachment of wiper assembly 25 to carrier arm 14, as illustrated in FIGS. 2 and 4. This arrangement essentially spring loads the cone-shaped guide 35 to captivate it in track 19. Guide wall 34 acts as a resilient arm for spring loading guide cone 35 with a predetermined force. In operation, guide cone 35 rides along the curved sides of adjacent turns of helix wire 18 to cause travel of wiper assembly 25 along arm 14. The sliding contacts occur at the tangent points 36a, 36b, as depicted in FIG. 4. In the illustrated embodiment, captivated guide cone 35 terminates above the horizontal center line 23 of helix guide 18. However, it will be understood that guide cone 35 may be designed so that its apical tip extends below center line 23 so long as it is not permitted to short resistor element 17. This is assured by the fact that the sides of guide cone 35 slides along the sides of adjacent turns of guide helix 18 above center line 23.

Guide cone 35 cannot escape captivation from helical track 19 because there is very little clearance, if any, between guide wall 34 and the adjacent overlaying portion of contact 27 which prevents cone guide 35 backing up out of helical track 19 after assembly of the unit. Thus, it is seen that once assembled, guide cone 35 of the improved wiper 25 remains continuously captivated. In addition, this structure inherently prevents accidental shorting with resistance wire 17. The small horizontal space or gap measured along center line 23 and between adjacent turns of helical wire 18 acts as a limit stop for cone-shaped guide 35 to preclude spurious contact with and shorting of wire 18.

FIGS. 7 and 8 illustrate another embodiment of a wiper assembly 40 in accordance with the principles of the invention. In this instance, a slide 41 similar to unit 26 is mounted for axial travel in either direction along arm 14. A contact arm 42 similar to unit 27 extends from wiper assembly 40 and has a nib at its outer end for slideably contacting resistor element 17, as described hereinbefore. Assembly 40 has first and second thin resilient-like metal arms 43, 44. The inner ends of spring arms 43, 44 are fastened to wiper assembly 40 underneath arm 14 by spot welding or other means. Arms 43, 44 extend laterally from slide 41 in opposite directions. Each arm 43, 44 has a guide cone 45 at its outer end similar to guide cone 35. Both arms 43, 44 are curved or bent to provide a predetermined spring force acting upon the respective guide cones 45 to hold same slideably captivated in track 19 of guide helix 18. In other words, the embodiment of FIGS. 7 and 8 relies upon a spring force to maintain guide cones 45 slideably captivated in helix track 19. Both guide cones 45 ride along helix track 19 with gaps between guide cones 45 and resistor element 17 to avoid contact therewith and shorting of same. As seen in FIG. 7, the tips of cones 45 terminate above the center line of helix wire 18. Wiper assembly 40 travels along arm 14 by reason of both spring arms 43, 44 engaging helix track 19. It is within the substance of this latter improvement to modify assembly 40 by eliminating either one of the spring arms 43 or 44 and rely solely upon the remaining leaf-like spring arm for operating wiper assembly 40.

It is intended that all matter contained in the above description or shown in the accompanying drawings shall be interpreted as illustrative and not in a limiting sense.

What is claimed is:

1. A multiturn potentiometer for providing a variable resistance comprising, an insulated core, a resistance element wound over said core in a helical pattern, an insulated guide helix wound along adjacent turns of said resistance element, the adjacent turns of said guide helix forming a helical groove, the cylinder defined by the outermost periphery of said guide helix having a diameter larger than that of the cylinder defined by the outermost periphery of said resistance element, a wiper assembly, movable means for imparting helical motion to said wiper assembly to provide the variable resistance, a wiper contact carried by said assembly and having a portion thereof extending into said helical groove for slideably contacting said resistance element, and resilient guide means carried by said wiper assembly and having at least one cone-shaped projection extending into said helical groove, said resilient means providing a spring force for holding said cone-shaped projection in said helical groove, said cone-shaped projection slideably engaging the turns of said guide helix to maintain a gap between the lower end of said projection and said resistance element, movement of said movable means guidably driving said wiper assembly helically along said resistance element.

2. A potentiometer as defined in claim 1, said cone-shaped projection being radially outside of the periphery of a cylinder defined by a center line extending through the adjacent turns of said guide helix.

3. A potentiometer as defined in claim 1 wherein, said wiper assembly including structure spaced adjacent said resilient guide means, the space between said guide means and said adjacent structure being less than the depth of penetration of said cone-shaped projection into said helical groove to captivate said cone-shaped projection in said groove.

4. A multiturn potentiometer for providing a variable resistance comprising, an insulated core, a resistance element wound in a helical pattern along said core, an insulated helix guide structure along adjacent turns of said resistance element for forming a continuous helical groove, the cylinder defined by the outermost periphery of said guide helix structure having a diameter larger than the cylinder defined by the outermost periphery of said resistance element, a wiper assembly, movable means for moving said wiper assembly relative to said resistance element winding for varying the resistance of the potentiometer, a wiper contact carried by said assembly to move therewith and also having a portion extending into said helical groove to contact slideably with said resistance element, and resilient guide means carried by said assembly to move therewith and having at least one cone-shaped projection extending into said helical groove, said resilient guide means providing a spring force for holding said cone-shaped projection in said groove, the lower end of said cone-shaped projection being spaced from said resistance element to define a gap therebetween, the extent of protrusion of said projection into said groove being controlled by the sides of said cone-shaped projection slideably engaging said guide helix structure, movement of said movable means causes said wiper assembly to trace a helical path corresponding to the turns of said resistance element.

5. A potentiometer as defined in claim 4, wherein said resilient guide means and adjacent structure of said wiper assembly defining a gap, and said gap being less than the depth of penetration of said cone-shaped projection into said helical groove for captivating said projection in said groove.

6. A potentiometer as defined in claim 4, wherein said resilient guide means including two resilient arms extending in opposite directions from said wiper assembly, each arm having a cone-shaped projection individually extending into said helical groove on opposite sides of said wiper assembly, said arms providing spring force for holding said projections in said groove.

References Cited in the file of this patent

UNITED STATES PATENTS

| | | |
|---|---|---|
| 2,361,010 | Cary et al. | Oct. 24, 1944 |
| 2,371,159 | Erb | Mar. 13, 1945 |
| 2,850,606 | MacLaren | Sept. 2, 1958 |
| 2,871,326 | Weidenman et al. | Jan. 27, 1959 |
| 2,973,497 | Wilkerson | Feb. 28, 1961 |